Dec. 8, 1925.  1,565,097
H. C. MUMMERT
DIFFERENTIAL AILERON CONTROL
Filed Feb. 29, 1924   2 Sheets-Sheet 1
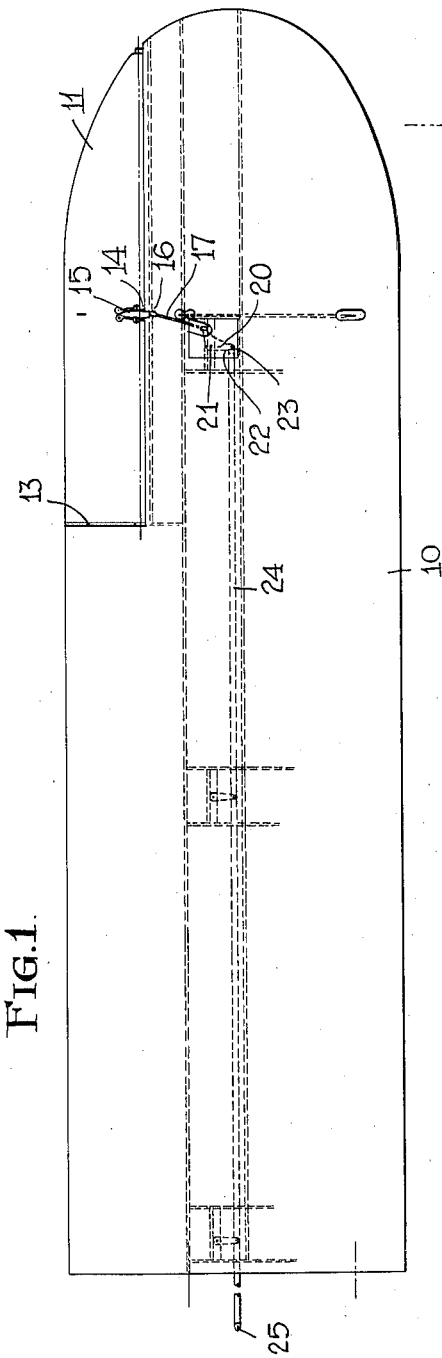
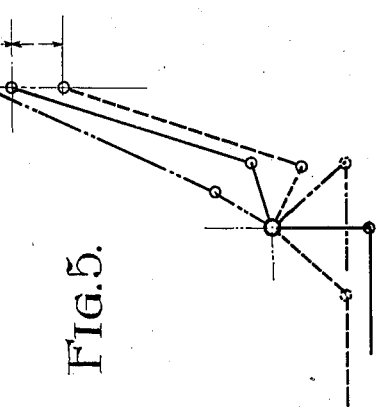
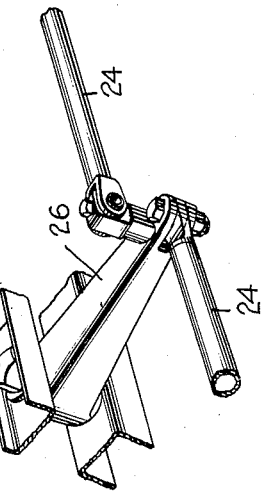
Inventor
HARVEY C. MUMMERT.
By his Attorney Dec. 8, 1925.
H. C. MUMMERT
DIFFERENTIAL AILERON CONTROL
Filed Feb. 29, 1924     2 Sheets-Sheet 2
1,565,097
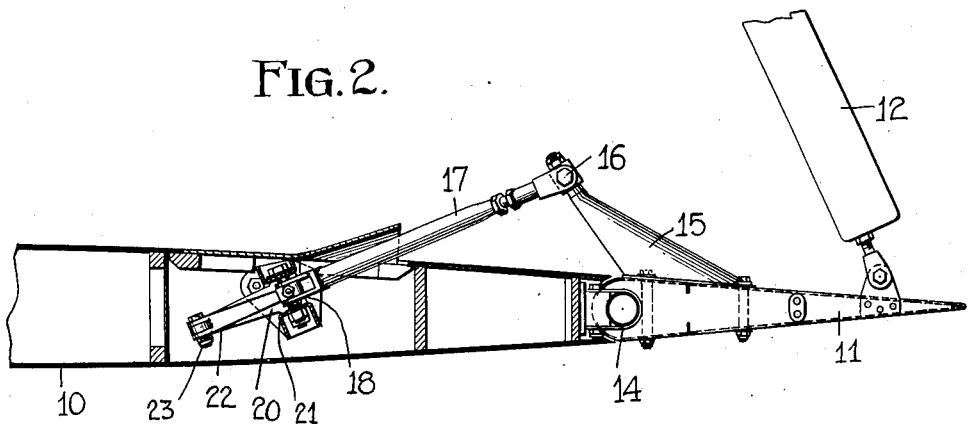
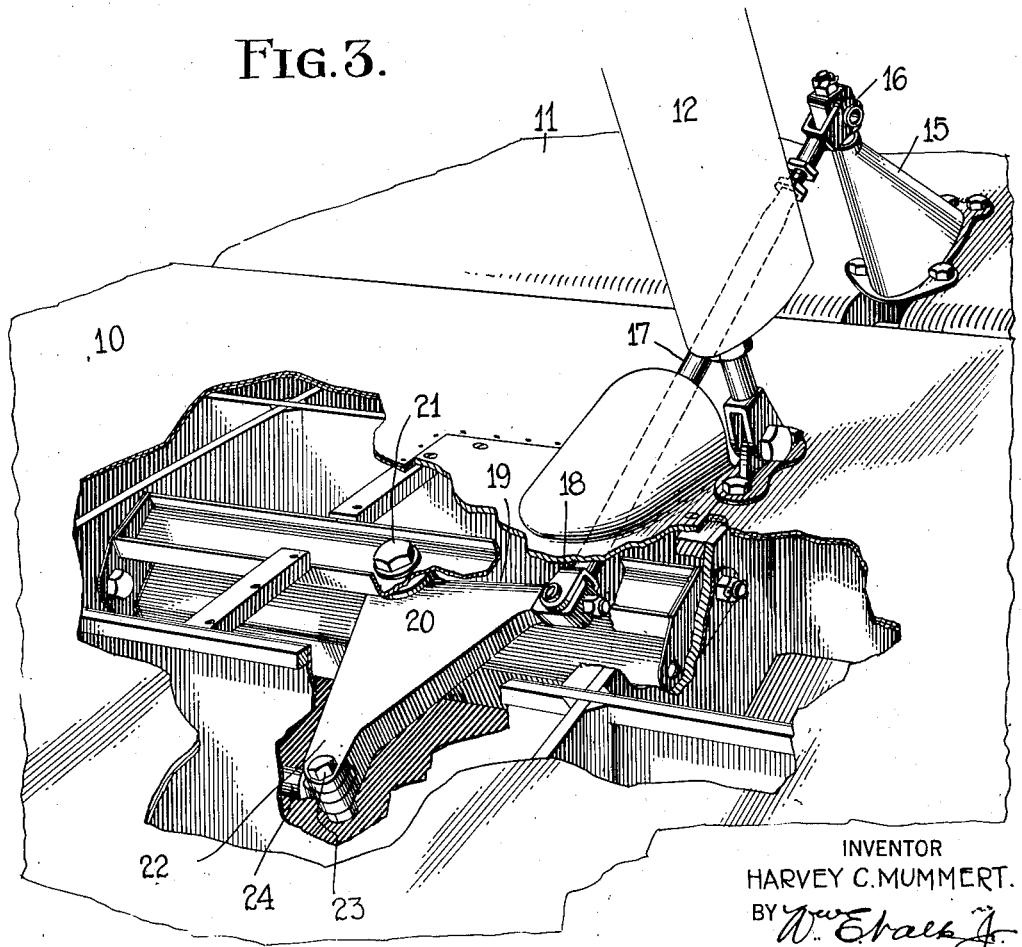
INVENTOR
HARVEY C. MUMMERT.
BY
ATTORNEY Patented Dec. 8, 1925.

1,565,097

UNITED STATES PATENT OFFICE.

HARVEY C. MUMMERT, OF HOLLIS, NEW YORK, ASSIGNOR TO CURTISS AEROPLANE AND MOTOR COMPANY, INC., OF GARDEN CITY, NEW YORK, A CORPORATION OF NEW YORK.

DIFFERENTIAL AILERON CONTROL.

Application filed February 29, 1924. Serial No. 695,963.

*To all whom it may concern:*

Be it known that I, HARVEY C. MUMMERT, a citizen of the United States, residing at Hollis, in the county of Queens and State of New York, have invented certain new and useful Improvements in Differential Aileron Controls, of which the following is a specification.

My invention relates to airplane control mechanism and more particularly to what may properly be designated a differential aileron control. In the control of an airplane it is highly desirable to secure increased control at or near stalling speeds. Throughout the flying range, and more particularly at low speeds, an upturned aileron gives better lateral control than an aileron downturned to the same relative angle. To move an aileron in an upward direction (within certain limits) little or no effort is required, whereas considerable effort is required to correspondingly move an aileron down. The common practice, to counteract this difference in effort, is to harness the two ailerons together for simultaneous opposite angular movement. A downturned aileron, as distinguished from an aileron upturned to the same degree, at or near stalling speeds, offers but little, if any, increased lift, and its controlling effect is practically negligible. The drag or resistance, however, which it offers thus turned, is very appreciable; much greater than that offered by the upturned aileron on the opposite side of the machine. This difference in drag or resistance, at slow speeds, defeats the very object which the movement of the ailerons aims to correct and the machine accordingly begins to turn, then side slip and finally spin wholly out of control. The object of the present invention is to counteract the above noted objectionable tendency by introducing a suitable aileron interconnection whereby the upturned aileron is given simultaneously a greater degree of movement than the downturned aileron on the opposite side of the machine. Such differential action, not only provides for a better control effect, without the damaging, turning or swinging, tendency but in addition, it tends to pull the upturned aileron down and at the same time relieves the operator, to some extent, of the effort required to be exerted in establishing control. Others I am aware have obtained such differential aileron action in various ways— the mechanism employed, however, being in each instance more or less involved, by no means positive in operation and invariably expensive by reason of the introduction of many costly parts. Hence the failure on the part of manufacturers to adopt a differential aileron control as standard equipment on the vast majority of machines. Extreme simplicity plus dependability, therefore, may be said to constitute those contributions of greatest importance to the continued development of this art.

Other objects, advantages and improved results will be hereinafter pointed out.

In the drawings, wherein like reference characters denote like or corresponding parts, Fig. 1 is a plan view of an aeroplane wing with the aileron control mechanism, for the major part, indicated by dotted lines;

Fig. 2 is a sectional view of the outer trailing edge portion of an aeroplane wing showing in detail a portion of the connection between the aileron and the element movable to effect its control;

Fig. 3 is a fragmentary perspective view further illustrating that portion of the control mechanism illustrated in Fig. 2;

Fig. 4 is a detail perspective view of the means employed to lend rigidity to the control, and Fig. 5 illustrates diagrammatically the differential action accorded the ailerons by reason of the mechanism employed.

In the embodiment of the invention selected for illustration 10 designates the upper right hand wing of a biplane, both wings of which are provided with ailerons 11 interconnected as at 12. Each aileron 11 is mounted in a recess 13 formed in the trailing edge of the wing and is pivoted as at 14 for swinging movement either up or down. At or near its leading edge (see Fig. 2) the aileron 11 is provided with a control lever 15 to the free end of which is fastened as at 16 a rod 17, said rod at its opposite end being in turn fastened as at 18 to one of the arms 19 of a bell crank 20. Said bell crank (see Fig. 3) is mounted within the confines of the wing 10 and is pivoted as at 21 to swing about an axis perpendicular to the rod 17, said rod, for reasons hereinafter explained, being set at an acute-angle to the horizontal. Preferably the axis of the bell crank is offset laterally with respect to a line passing in a fore and aft direction thru the point of connection between the rod 17 and the aileron control lever 15, such disposition of the connection 21 tending to accentuate the differential action accorded the aileron. The second arm of the bell crank 20, designated as 22, extends forwardly within the wing 10 and at its free end is fastened as at 23 to a rod 24 carried wholly within its confines and extended inwardly throughout the length of the wing to a point 25 inside the fuselage or body of the machine where it is fastened by any suitable means to that form of control device employed. Said control device (not shown) may be of any conventional form. Intermediately of its ends the rod 24 is braced as indicated, arms 26 pivoted as at 27 and fastened at their free ends to the rod 24, being employed for this purpose.

Control mechanism of the character described is non-flexible throughout and it is such non-flexibility which admits of the attainment of the differential action desired. The arms of the bell crank 20, it will be noted, define an angle other than a right-angle, and it is this angular relation of the bell crank arms plus the offsetting of the bell crank axis which enable me to attain the desired result. By offsetting the axis of the bell crank, (see Fig. 5) a greater degree of movement of the aileron in an upward direction than in a downward direction is obtained for a given movement of the rod 24. This differential movement is accentuated by reason of the angular relation of the bell crank arms. So long as the arms of the bell crank (if arranged as illustrated) define an angle greater than a right-angle the movement of the control surface, for a given movement of the rod 24, is greater in an upward direction than it is when moved down. As pointed out hereinbefore, such a differential action is extremely desirable in effecting or maintaining control at speeds approaching the stalling point, and since the ailerons or control surfaces at opposite sides of the machine are interconnected for simultaneous movement, obviously the lack of effort required to move one aileron up is balanced by the preponderance of effort required to move the opposite aileron down.

In making the interconnection between the control element and the aileron rigid or non-flexible throughout, the use of a bell crank in the manner indicated is made possible, since the movement of the rod 24, whether it be pushed or pulled, acts upon the bell crank to produce the differential action sought to be attained. Moreover, by disposing the axis of the bell crank at the angle indicated, the control connection is simplified and its complete enclosure within the confines of the wing made possible.

While I have described my invention in detail in its present preferred embodiment, it will be obvious to those skilled in the art after understanding my invention, that various changes and modifications may be made therein without departing from the spirit or scope thereof, I aim in the appended claims to cover all such modifications and changes.

What I claim is:

1. The combination with the supporting surface of an aeroplane, of control mechanism including a movable control surface and an element operable to move said control surface, and a connection between said control surface and said element having incorporated therein a bell crank, said bell crank being housed within said supporting surface and having its arms so related one to the other as to define an angle other than a right angle whereby in the operation of said element a differential action in the movement of said control surface is provided.

2. The combination with the supporting surface of an aeroplane, of control mechanism including a movable control surface and an element operable to move said control surface, and a connection between said control surface and said element having incorporated therein a bell crank, said bell crank being housed within said surface and having its arms so related one to the other as to define an angle other than a right angle, the axis of the bell crank being offset laterally with respect to a straight line passing in a fore and aft direction thru the point of attachment of said connection with said control surface whereby in the operation of said element a differential action in the movement of said control surface is provided.

3. In airplane control mechanism, a control surface, an element movable to actuate said surface, and means to produce a differential action in the operation of said surface comprising a connection between said element and said surface, said connection having incorporated therein a pivoted member in which the pivot axis thereof is laterally offset with respect to a straight line passing in a fore and after direction thru the point of attachment of said connection with said surface.

4. In airplane control mechanism, a control surface, an element movable to actuate said surface, and means to produce a differential action in the operation of said surface comprising a non-flexible connection between said element and said surface having incorporated therein a bell crank, the arms of which define an angle other than a right-angle and in which the pivot axis thereof is laterally offset with respect to a straight line passing in a fore and aft direction thru the point of attachment of said connection with said surface.

5. In airplane control mechanism, a control surface, an element movable to actuate said surface, a bell crank having arms so related one to the other as to define an angle other than a right-angle, a rigid connection between one of said arms and said element, and a rigid connection between the other of said arms and said control surface, said last mentioned connection being extended from a point within to a point without the control surface at an acute-angle to the horizontal and said bell crank having its pivot axis perpendicular to said last mentioned connection.

In testimony wherof I hereunto affix my signature.

HARVEY C. MUMMERT.